June 18, 1929.  W. A. STARCK  1,717,897
AUTOMOBILE BUMPER
Filed Feb. 8, 1928    2 Sheets-Sheet 2

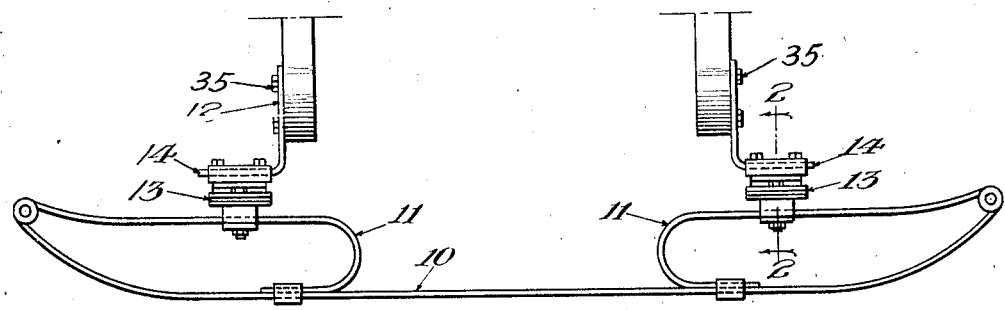
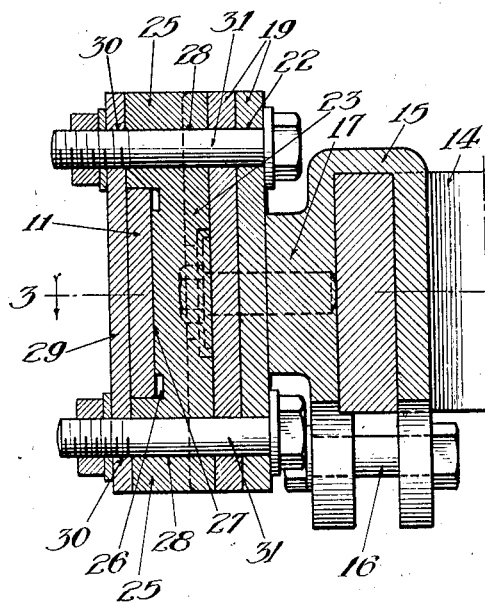
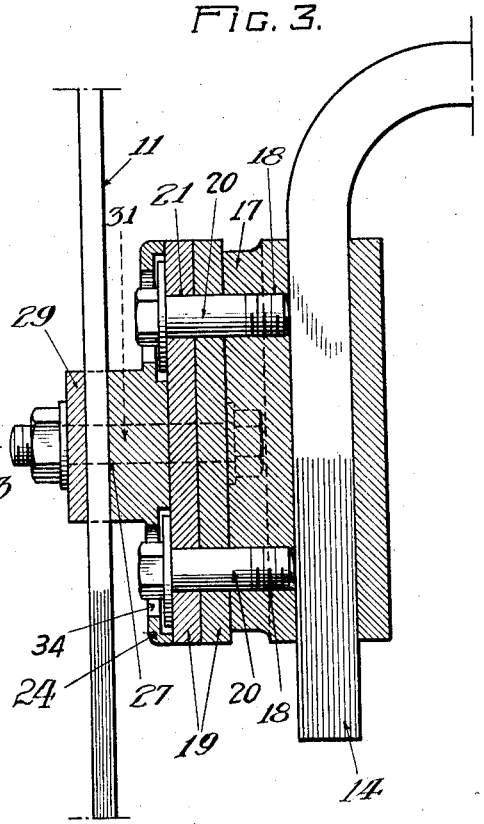

Inventor:
William A. Starck
By Edwin B. H. Tower Jr
Atty.

Patented June 18, 1929.

1,717,897

UNITED STATES PATENT OFFICE.

WILLIAM A. STARCK, OF MILWAUKEE, WISCONSIN, ASSIGNOR TO BADGER MANUFACTURING CORPORATION, OF MILWAUKEE, WISCONSIN, A CORPORATION OF DELAWARE.

AUTOMOBILE BUMPER.

Application filed February 8, 1928. Serial No. 252,814.

This invention relates to automobile bumpers.

The bumper to which the invention applies in particular has the impact member attached by means of couplings to the supporting brackets.

The object of the invention is to provide an automobile bumper having couplings which permit relative movement between the impact member and the supporting brackets.

Another object is to provide couplings which are noiseless and require no lubrication.

Another object is to provide resilient cushions between the impact member and the attaching brackets to absorb vibrations.

Another object is to provide an automobile bumper having couplings which permit the impact member to have a limited universal movement to adjust itself under an impact and utilize the full capacity of the bumper to absorb shocks.

Another object is to provide an automobile bumper coupling which is simple in construction and economical to manufacture.

According to the invention, sheets of flexible, resilient material are attached to the impact member by one set of fasteners and to the supporting brackets by another set of fasteners.

The center lines of two sets of fasteners may be arranged at right angles to each other in order to allow the disks to flex equally in all directions.

An automobile bumper having couplings embodying the invention is shown in the accompanying drawings in which the views are as follows:

Fig. 1 is a top plan view.

Fig. 2 is a central vertical section through a coupling, taken on the line 2—2 of Fig. 1.

Fig. 3 is a sectional plan taken on the line 3—3 of Fig. 2.

Figure 4:
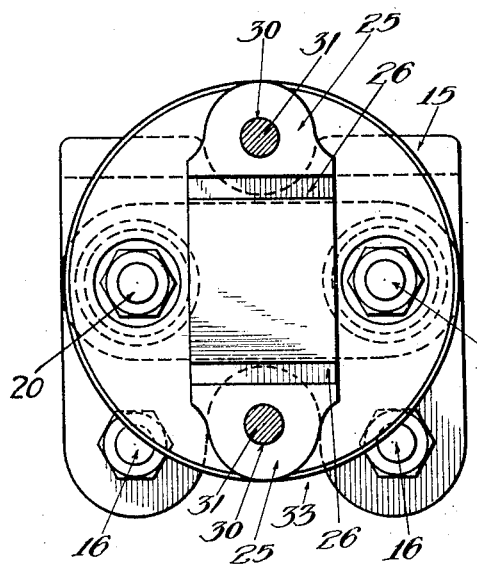
Fig. 4 is a front view of a coupling.
Figure 5:
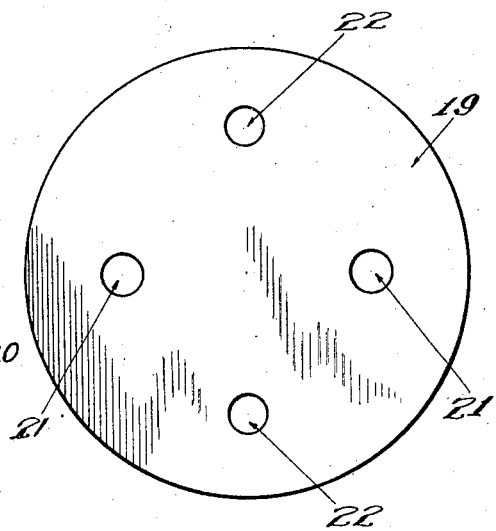
Fig. 5 is a detail of one of the flexible sheets or disks.
Figure 6:
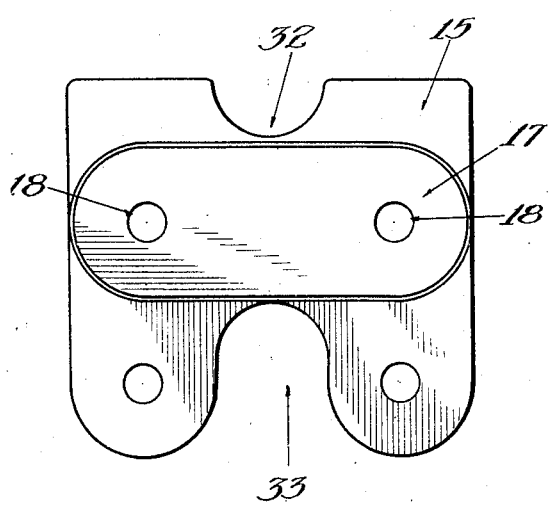
Fig. 6 is a front view of the attaching clamp.
Figure 7:
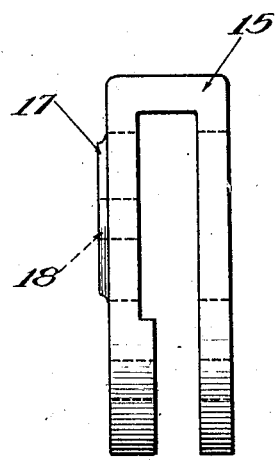
Fig. 7 is an end view thereof.

The bumper comprises, in general, an impact member, having spring impact bars 10 and spring supporting bars 11 connected at the ends thereof to the impact bar, supporting brackets 12 for attaching the bumper to an automobile, and couplings 13 connecting the impact member to the supporting brackets.

The impact member and the supporting brackets are shown for illustrative purposes only as the couplings may be incorporated in other types of bumpers.

The end 14 of each bracket 12 is arranged at right angles to the center line of the automobile and embraced by a clamp 15 which is secured thereon by bolts 16 and provided with an elongated face or seat 17 having a threaded bolt hole 18 near each end thereof.

One or more sheets or disks 19 of flexible, resilient material, such as rubber impregnated fabric, are attached to the seat 17 by bolts 20 which pass through the holes 21 in the disks 19 and are threaded into the holes 18.

The disk 19 may be made of any suitable material which is strong, flexible and resilient, and is provided with a second set of holes 22 which are spaced from the holes 21 and preferably so arranged that a line joining the holes 21 is disposed at right angles to a line joining the holes 22 in order that the impact member may have a uniform but limited universal movement.

The impact member is supported at either end by a block 23 which has a circular base 24 to abut the disk 19 and parallel shoulders 25 to hold the supporting bar 11 against vertical movement.

Grooves 26 are formed in the block 23 contiguous to the shoulders 25 and a seat 27 is provided therebetween for the supporting bar 11.

The shoulders 25 are provided with bolt holes 28 and a clamping plate 29 with bolt holes 30 to accommodate bolts 31 which pass therethrough and through the bolt holes 22 in the disks 19 to clamp the block 23 to the disk 19 and the supporting bar 11 to the seat 27.

The clamp 15 has an upper recess 32 and a lower recess 33, to provide access to the heads of the bolts 31, and the block 23 has apertures 34 to provide access to the heads of the bolts 16, thus permitting the impact member to be readily attached to the brackets 12 which may be attached to an automobile by bolts 35.

The flexible disks permit movement of the impact member on a horizontal axis defined by the bolts 20 and on a vertical axis defined by the bolts 31.

The disks also provide a cushion between the impact member and the supporting brackets to absorb vibrations which would otherwise be imparted to the automobile by the impact member, prevent the attaching bolts from loosening, and eliminate rattles and squeaks.

The face of the impact bar 10 is held normally in a vertical plane but the disks 19 will flex under the force of a collision and permit the impact member to receive the impact evenly upon its face and distribute the force thereof throughout the bumper.

The invention herein set forth is susceptible of various modifications and adaptations without departing from the scope thereof as hereafter claimed.

The invention is hereby claimed as follows:

1. An automobile bumper comprising an impact member, supports therefor, resilient members arranged between said impact member and said supports, and separate fasteners connecting said resilient members to said impact member and to said supports.

2. An automobile bumper comprising an impact member, brackets to support the same, resilient members arranged between said impact member and said brackets, fastening means connecting said resilient members and said impact member, and other fastening means connecting said resilient members and said brackets.

3. An automobile bumper comprising an impact member, supports therefor, resilient members arranged between said impact member and said supports, and separate fasteners connecting said resilient members to said impact member and to said supports and arranged in angular relation to each other.

4. An automobile bumper comprising an impact member, supports therefor, resilient members arranged between said supports and said impact member, seats arranged between said resilient members and said impact member, and separate fastening means connecting said resilient members to said impact member and to said supports.

5. An automobile bumper comprising an impact member, brackets to support the same, resilient members arranged between said brackets and said impact member, recessed seats arranged between said resilient members and said impact member, fastening means connecting said resilient members and said impact member, and other fastening means connecting said resilient members and said brackets.

6. An automobile bumper comprising an impact member, brackets for attaching the same to an automobile, resilient members arranged between said impact member and said brackets, and separate fastening means connecting said resilient members to said impact member and to said brackets and permitting a limited universal movement of said impact member relatively to said automobile.

7. A coupling, for connecting the impact member of an automobile bumper to a support therefor, comprising a sheet of resilient material, fastening means connecting said sheet to said impact member, and other fastening means connecting said sheet to said support and arranged in angular relation to said first mentioned means.

8. A coupling, for connecting the impact member and the bracket of an automobile bumper, comprising a support for attachment to said bracket, and a sheet of resilient material fastened to said support to permit the same to move in one direction relatively to said impact bar, and fastened to said impact bar to permit the same to move in another direction relatively to said support.

9. A coupling, for connecting the impact member and the bracket of an automobile bumper, comprising a clamp for attachment to said bracket, and a sheet of resilient material attached to said impact member at diametrically opposite points to permit the same to move in one direction and attached to said clamp at points diametrically opposite each other and angularly spaced from said first mentioned points to permit said impact member to move in another direction.

10. A coupling, for connecting the impact member and the bracket of an automobile bumper, a support for attachment to said bracket, a sheet of resilient material, a row of fasteners securing said sheet to said support, a clamp for attachment to said impact member, and a second row of fasteners intersecting said first mentioned row of fasteners and securing said sheet to said clamp.

11. An automobile bumper comprising a block having a recess and a seat formed therein, an impact member supported in said recess and clamped to said seat, a sheet of resilient material, means securing said sheet to said block, a clamp for attachment to a bracket, and means arranged in angular relation to said first mentioned means and securing said clamp to said sheet.

In witness whereof, I have hereunto subscribed my name.

WILLIAM A. STARCK.